United States Patent

Reid

[11] Patent Number: 5,118,070
[45] Date of Patent: Jun. 2, 1992

[54] STABILIZER BAR MOUNT

[75] Inventor: Glenn J. Reid, Bloomfield Hills, Mich.

[73] Assignee: Flexible Products Co., Auburn Hills, Mich.

[21] Appl. No.: 701,226

[22] Filed: May 16, 1991

[51] Int. Cl.⁵ .............................................. F16M 13/00
[52] U.S. Cl. ................................. 248/635; 280/665; 384/300
[58] Field of Search .............. 248/635; 280/665, 96.1, 280/788; 267/270, 141.2, 141.4, 141.3; 384/300

[56] References Cited

U.S. PATENT DOCUMENTS

| 167,068 | 8/1875 | Berlin | 267/270 |
|---|---|---|---|
| 3,033,587 | 5/1962 | Perish | 280/665 |
| 3,039,831 | 6/1962 | Thomas | 280/96.1 X |
| 3,424,447 | 1/1967 | Miller | 267/270 X |
| 3,831,970 | 8/1974 | Muller | 280/665 X |
| 4,626,112 | 12/1986 | Kramer | 384/300 |
| 4,802,430 | 2/1989 | Kramer | 384/300 X |
| 4,865,467 | 9/1989 | Becker | 384/300 X |

FOREIGN PATENT DOCUMENTS 636463 9/1936 Fed. Rep. of Germany ........ 248/60

Primary Examiner—J. Franklin Foss
Attorney, Agent, or Firm—Krass & Young

[57] ABSTRACT

A rubber mount for a stabilizer bar. A rubber mount used for mounting a stabilizer bar to the frame of a motor vehicle having a solid sleeve of low friction material inserted in the bore on the mount to allow the stabilizer bar to rotate freely and noiselessly within the mount. The sleeve being bonded or secured to the elastic or rubber support contained by a U-shaped bracket secured to the motor vehicle frame.

4 Claims, 2 Drawing Sheets

STABILIZER BAR MOUNT

FIELD OF THE INVENTION

This invention relates to a stabilizer bar mount formed of an elastic material and having a bore in which the stabilizer bar is received. A sleeve of low friction material is inserted in the bore and provides a low friction surface in which the bar may rotate.

BACKGROUND OF THE INVENTION

Motor vehicles use a stabilizer bar installed across the frame of the vehicle between the lower control arms of the vehicle's suspension system (see FIG. 1) to control vehicle sway during turns. When a vehicle travels around a curve, the centrifugal force tends to keep the vehicle body moving in a straight line, causing the vehicle to lean outward, i.e., away from the direction of the turn, putting additional compressive force on the outer coil spring and causing the outer control arm to move upward, which carries one end of the stabilizer bar upward. The inner coil spring is placed in tension during the turn as there is less weight on the inner control arm, which lowers the control arm and carries the opposite end of the stabilizer bar downward. Thus, when turning a vehicle, the outer end of the stabilizer bar is carried upward and the inner end is carried downward, causing a rotational or twisting movement of the stabilizer bar. Therefore, the stabilizer bar must be mounted to the frame using a mounting system which allows the stabilizer bar to rotate.

Prior art systems mount the stabilizer bar on the vehicle frame with a U-shaped bracket securing a rubber or rubber like support member having a bore equal in size to the outer diameter of the stabilizer bar. The stabilizer bar, since not a visible portion of the vehicle and needed only for structural integrity, is an unfinished piece of forged metal having a rough and scaly exterior.

When the stabilizer bar rotates within the rubber support member, i.e., during a turn, a "squawk" or other audible noise is produced as a result of the friction occurring between the stabilizer bar and the rubber support. While this noise does not affect the performance of the vehicle, it is irritating to the vehicle owner and results in consumer complaints and increased warranty costs.

In an attempt to eliminate the "squawk," a fabric sleeve has been compression molded in the interior of the bore to provide an interface between the stabilizer bar and the rubber support thus eliminating the "squawk." However, during the molding of the rubber support, the rubber, as a result of compression molding, bleeds through the ports of the fabric allowing a portion of the rubber support to contact the stabilizer bar. While the "squawk" is reduced, it is still present. Further, as the fabric liner wears due to the rough exterior of the stabilizer bar, a greater amount of the rubber comes in contact with the stabilizer bar, increasing the amount of "squawk" occurring when turning the vehicle and correspondingly decreasing customer satisfaction with the vehicle.

Accordingly, it is an object of the present invention to provide an elastic noise-free mount for use in mounting a stabilizer bar on a motor vehicle.

SUMMARY OF THE INVENTION

The present invention relates to a new and useful elastic stabilizer bar mount designed to eliminate the noise resulting from rotation of the stabilizer bar within the mount.

According to the invention, a sleeve made of a suitable low-friction material is bonded to the inner diameter of a bore on an elastic support member. The sleeve provides a low friction surface on which the stabilizer bar may rotate, thus eliminating the noise or "squawk" problem. This and other aspects of the present invention will become apparent from the following detailed description and the accompanying drawings.

DETAILED DESCRIPTION OF THE PREFERRED EMBODIMENT

Figure 1:
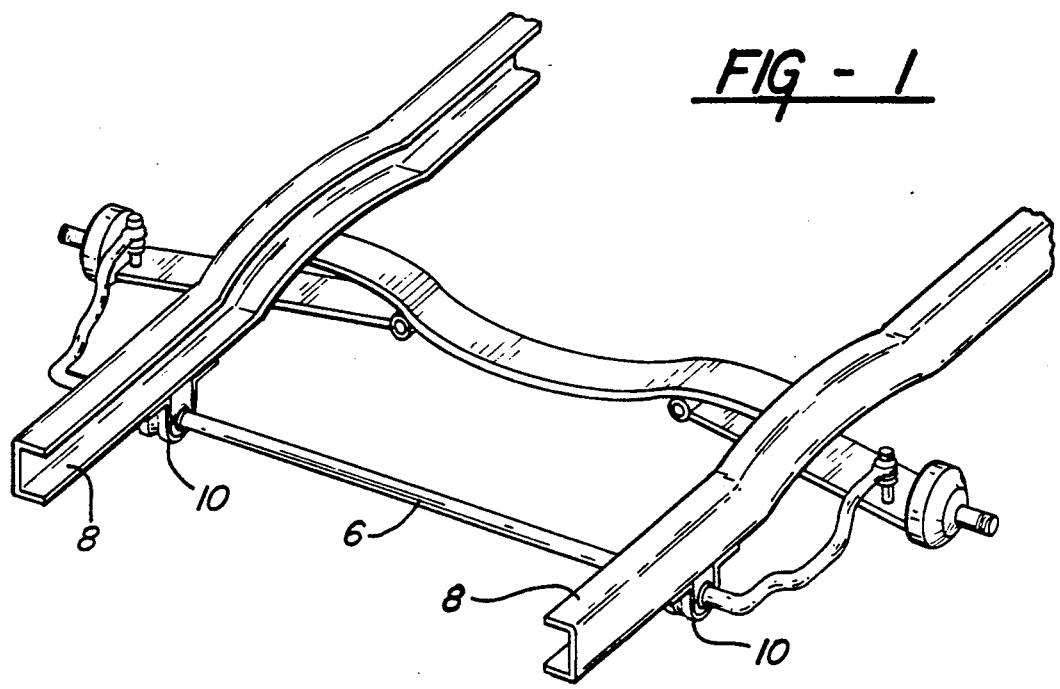
FIG. 1 is a partial perspective view of a stabilizer bar mounted to a vehicle frame utilizing a mounting member of the present invention.
Figure 2:
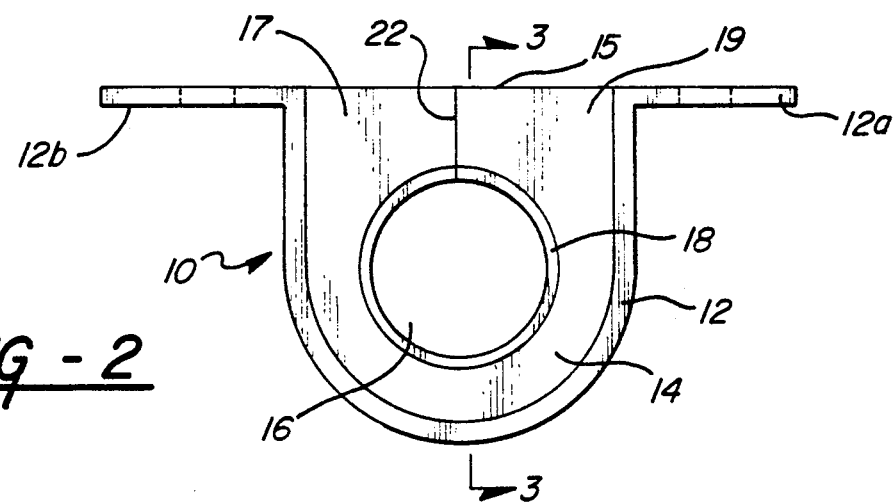
FIG. 2 is an elevational view of the mounting member of the present invention.
Figure 3:
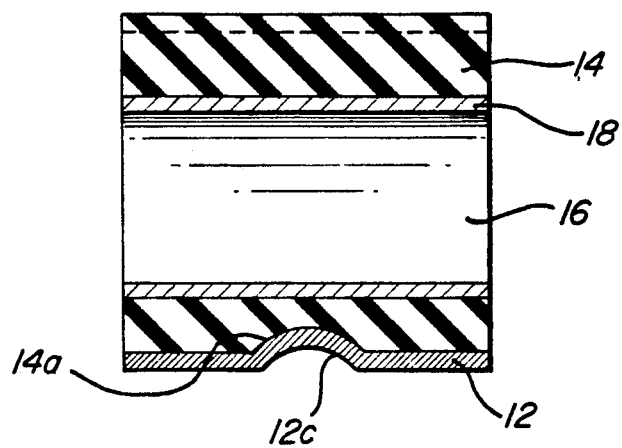
FIG. 3 is a sectional view of the mounting member of FIG. 2 taken on the line 3—3.
Figure 4:
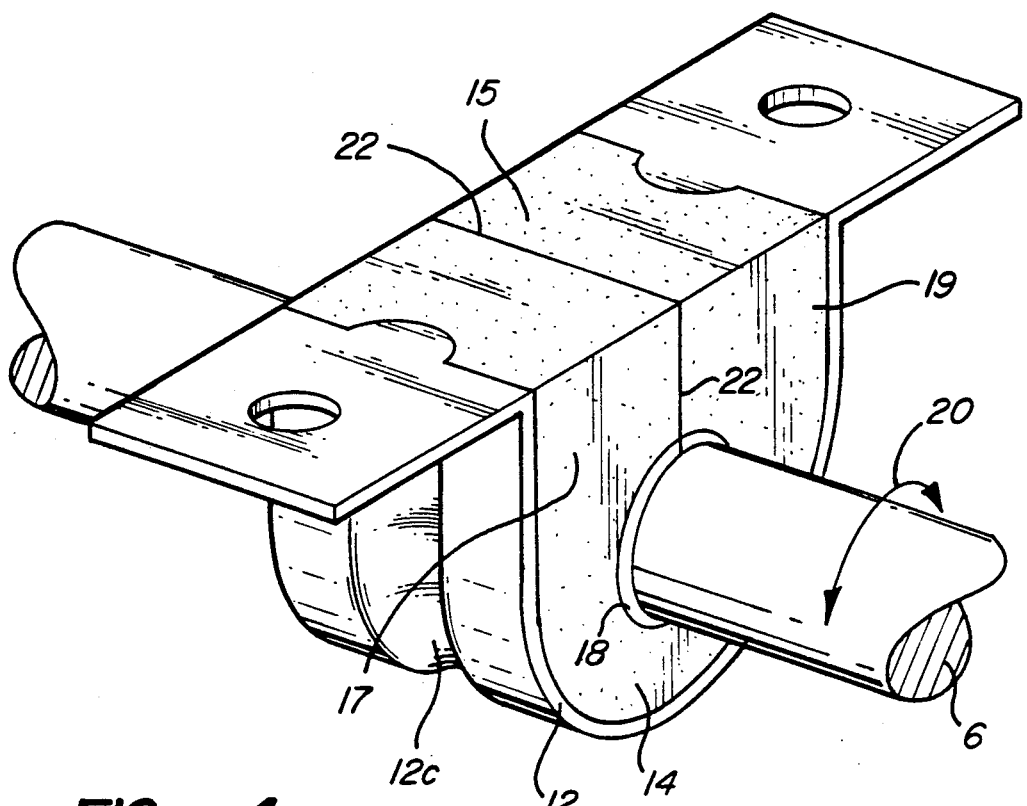
FIG. 4 is a perspective view of the mounting member of the present invention.

Referring to the drawings, there is shown a molded rubber stabilizer bar mount for use in mounting a stabilizer bar to the frame of a motor vehicle.

Referring to FIGS. 1-4, the stabilizer bar mount 10 is an elastic member 14 which is formed of natural rubber or other elastomeric material held in position on the vehicle frame 8 by a U-shaped metal supporting bracket 12 secured at both longitudinal ends 12a, 12b to the vehicle frame 8 (as shown in FIG. 1). The elastic member 14 is secured in position by a seating surface 14a formed in the elastic member 14 and corresponding to a protuberance 12c on the U-shaped member 12. The elastic member includes a bore 16 extending therethrough. The stabilizer bar 6 is mounted within the transverse bore 16 of the elastic member 14 through a slit 22 extending from the upper surface 15 of the elastic member 14 to the bore hole 16. The slit 22 allows the operator to grasp respective side portions 17, 19 of the elastic member 14 opposite the slit 22 and, due to the flexibility of the elastic member 14, pull the respective opposite sides 17, 19 apart, creating an opening or gap of sufficient size to allow entry of the stabilizer bar 6 into the bore 16. Once the bar 6 has been installed in the bore 16, the operator simply releases the opposite 17, 19 sides of the elastic member 14 whereby the gap is closed. The elastic member may then be placed into the U-shaped bracket 12 and fastened to the vehicle frame 8. This mounting arrangement enables the stabilizer bar 6 to be secured in such a manner that it is rotatable about its longitudinal axis (the direction of the arrow 20 in FIG. 4).

To prevent the noise or "squawk" which previously occurred when the stabilizer bar 6 rotated within the elastic member 14, a sleeve or bushing 18 of a low friction material is bonded to the inner diameter of the bore 16. Sleeve 18 is probably fabricated from a low friction fluoroplastic such as polytetrafluoroethylene (PTFE) sold under the trademark Teflon ® by DuPont Company. Other sleeve materials can include nonfluorinated polymers such as nylons, polyethylene and the like.

Prior to bonding the low friction insert sleeve 18 to the elastic member 14, the exterior surface of the sleeve 18, i.e., the bonding surface, is chemically treated to insure a bond between the sleeve 18 and the elastic member 14. In the preferred embodiment, the bonding surface of the sleeve 18 is treated with acid, specifically nitric acid, to clean and prepare the insert for bonding. Other acids, such as sulfuric and hydrochloric acid as well as other chemical treatments could be used to treat the exterior of the sleeve to insure a bond between the sleeve 18 and the elastic member 14. Additionally, the sleeve may be physically treated, i.e., provided with a roughened exterior surface, by abrading or sand blasting to ensure a bond between the sleeve 18 and the elastic member 14.

The use of a low friction insert fabricated from PTFE provides a stabilizer bar mount which eliminates any noise or "squawk" resulting from a direct rubber or elastic material to metal contact. A sleeve fabricated from PTFE, while preventing noise, exhibits the necessary flexibility to withstand the vibration of the vehicle and the bending stresses occurring in the elastic member 14 during installation of the elastic member 14 on the stabilizer bar 6.

A further benefit resulting from the use of a low friction fluoroplastic, such as PTFE, is that as the liner wears due to constant contact with the rough exterior of the stabilizer bar, the material adheres to the rough portion of the stabilizer bar 6, whereby the migration of the liner material to the stabilizer bar 6 provides additional lubrication between the bar 6 and the elastic member 14, which increases the life of the stabilizer mount 10. The thickness of the sleeve 18 may also be increased to increase the wear period, i.e., the time it takes to wear through the sleeve 18 and expose the elastic member 14 to contact with the stabilizer bar 6.

Figure 5:
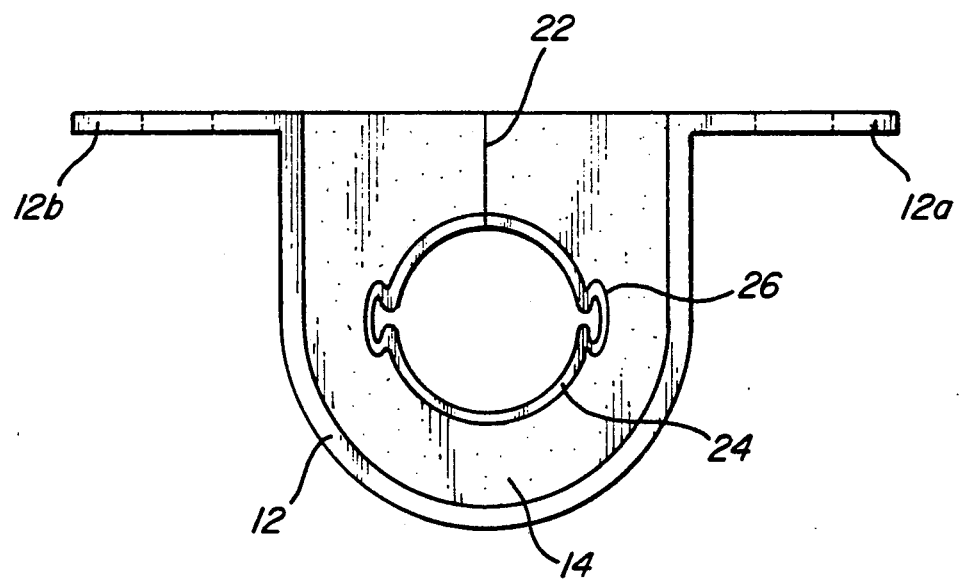
FIG. 5 is an elevation view of a mounting member of the present invention having a variable cross-sectional shaped liner.

Although the sleeve as disclosed herein is shown as a cylindrical member, the sleeve may also be formed of other cross-sectional shapes while remaining generally cylindrical. Referring to FIG. 5, there is shown a sleeve 24 having a generally cylindrical cross-section including ear portions 26 allowing a standard size sleeve 24 to be used with several different diameter stabilizer bars 6. The ear portions 26 enable the sleeve 24 to be compressed or expanded to the required size. While the cross-sectional shape of the sleeve 24 must remain generally cylindrical to conform to the shape of stabilizer bar 6, the ear portions 26 may be formed of any shape which enables the sleeve 24 to be expanded or compressed. Further, while only two ear portions 26 are shown, additional ear portions 26 may be added without departing from the scope of the invention.

The ear portions 26 also provide additional bonding surfaces, which aid in positively bonding and locking the sleeve 24 to the elastic member 14. The ear portions 26 prevent both rotation of the sleeve 24 within the elastic member 14 and keep the sleeve 24 from being pulled away from the elastic member 14 during either installation or vehicle operation.

It will be seen that the above identified device provides a long-lasting, noise-free stabilized bar mount for use in mounting the stabilizer bar to the frame of an a motor vehicle. Other modifications and uses for the present invention will become apparent to one skilled in the art upon the study of the specifications, drawings and claims.

I claim:

1. A mount for a stabilizer bar of a motor vehicle comprising:
    a U-shaped bracket secured to a portion of the vehicle frame;
    an elastic element positioned in and supported by the U-shaped bracket, said elastic element having a bore therethrough, said bore receiving and supporting said stabilizer bar; and
    a solid sleeve of low friction material positioned and bonded to said elastic element within said bore whereby said stabilizer bar rotates in said low friction material sleeve.

2. A mount for a stabilizer bar according to claim 1 wherein said low friction material comprises a fluoroplastic.

3. A mount for a stabilizer bar according to claim 2, wherein said fluoroplastic comprises polytetrafluoroethylene.

4. A mount for a stabilizer bar according to claim 1 wherein said sleeve contains projections extending outward from an outer diameter of said sleeve.

* * * * *